United States Patent
Cavitt et al.

(10) Patent No.: US 11,572,851 B2
(45) Date of Patent: Feb. 7, 2023

(54) REACTION CONTROL VORTEX THRUSTER SYSTEM

(71) Applicant: Sierra Space Corporation, Broomfield, CO (US)

(72) Inventors: Ryan C. Cavitt, Waunakee, WI (US); Trevor P. Ormonde, Madison, WI (US); Jake W. Carey, Madison, WI (US); Patrick D. Satyshur, Madison, WI (US); Christopher P. St. Clair, Madison, WI (US); Scott M. Munson, Monona, WI (US)

(73) Assignee: Sierra Space Corporation, Broomfield, CO (US)

( * ) Notice: Subject to any disclaimer, the term of this patent is extended or adjusted under 35 U.S.C. 154(b) by 0 days.

(21) Appl. No.: 16/449,229

(22) Filed: Jun. 21, 2019

(65) Prior Publication Data

US 2020/0400103 A1 Dec. 24, 2020

(51) Int. Cl.
| | | |
|---|---|---|
| F02K 9/68 | (2006.01) | |
| F02K 9/28 | (2006.01) | |
| F02K 9/72 | (2006.01) | |
| F02K 9/42 | (2006.01) | |

(Continued)

(52) U.S. Cl.
CPC .................. *F02K 9/68* (2013.01); *F02K 9/28* (2013.01); *F02K 9/42* (2013.01); *F02K 9/425* (2013.01); *F02K 9/44* (2013.01); *F02K 9/58* (2013.01); *F02K 9/72* (2013.01)

(58) Field of Classification Search
CPC ... F02K 9/42; F02K 9/425; F02K 9/44; F02K 9/58; F02K 9/68
See application file for complete search history.

(56) References Cited

U.S. PATENT DOCUMENTS

| 3,059,429 A | 10/1962 | Bjerklie et al. |
| 3,091,520 A | 5/1963 | Newburn |
| 3,115,007 A | 12/1963 | Fox |

(Continued)

FOREIGN PATENT DOCUMENTS

| CN | 110118136 A | 8/2019 |
| JP | H07 310594 A | 11/1995 |
| WO | WO-2020/076975 A1 | 4/2020 |

OTHER PUBLICATIONS

Cervone et al., Development of Hydrogen Peroxide Monopropellant Rockets, 2015, AIAA (Year: 2015).*

(Continued)

*Primary Examiner* — Todd E Manahan
*Assistant Examiner* — Kyle Robert Thomas
(74) *Attorney, Agent, or Firm* — Mintz Levin Cohn Ferris Glovsky and Popeo, P.C.

(57) ABSTRACT

Various embodiments of a vortex thruster system is described herein that is configured to create at least three discrete thrust levels. In some embodiments, the vortex thruster system is configured to decompose a monopropellant and deliver the decomposed monopropellant into a vortex combustion chamber for generating various thrust levels. In some embodiments, the vortex thruster system includes a secondary propellant valve configured to deliver a secondary propellant into the vortex combustion chamber containing decomposed monopropellant to create a high thrust level. Related systems, methods, and articles of manufacture are also described.

14 Claims, 3 Drawing Sheets

(51) Int. Cl.
*F02K 9/44* (2006.01)
*F02K 9/58* (2006.01)

(56) References Cited

U.S. PATENT DOCUMENTS

| | | | |
|---|---|---|---|
| 3,135,703 | A | 6/1964 | Sill |
| 3,158,997 | A | 12/1964 | Blackman et al. |
| 3,177,657 | A | 4/1965 | Strauss et al. |
| 3,201,973 | A | 8/1965 | Fitzgerald |
| 3,315,472 | A | 4/1967 | Moutet |
| 3,368,353 | A | 2/1968 | Allport |
| 3,426,534 | A | 2/1969 | Murphy |
| 3,560,407 | A | 2/1971 | McCormick |
| 3,618,324 | A | 11/1971 | Munding |
| 3,640,072 | A | 2/1972 | Kayser |
| 3,648,461 | A | 3/1972 | Bailey et al. |
| 3,695,041 | A * | 10/1972 | Eggers .............. C06B 47/08 60/264 |
| 3,712,059 | A | 1/1973 | Drexhage |
| 3,715,888 | A | 2/1973 | Massie et al. |
| 3,768,253 | A | 10/1973 | Drawbaugh |
| 3,773,462 | A | 11/1973 | Waeselynck |
| 3,871,828 | A | 3/1975 | Ellion et al. |
| 3,899,815 | A | 8/1975 | Maddox |
| 3,956,885 | A | 5/1976 | Davis et al. |
| 4,069,664 | A | 1/1978 | Ellion et al. |
| 4,322,946 | A | 4/1982 | Murch et al. |
| 4,811,556 | A | 3/1989 | Lau et al. |
| 4,817,890 | A | 4/1989 | Coffinberry |
| 4,840,025 | A * | 6/1989 | Coffinberry .............. F02K 9/64 102/289 |
| 4,841,723 | A | 6/1989 | Lau et al. |
| 5,010,730 | A | 4/1991 | Knuth et al. |
| 5,101,623 | A | 4/1992 | Briley |
| 5,107,129 | A | 4/1992 | Lombrozo et al. |
| 5,319,926 | A * | 6/1994 | Steenborg .............. B64G 1/406 60/203.1 |
| 5,367,872 | A | 11/1994 | Lund et al. |
| 5,372,070 | A | 12/1994 | Neidert et al. |
| 5,404,715 | A | 4/1995 | Vuillamy et al. |
| 5,529,648 | A | 6/1996 | Stickler et al. |
| 5,582,001 | A | 12/1996 | Bradford et al. |
| 5,622,046 | A | 4/1997 | Michaels et al. |
| 5,715,675 | A | 2/1998 | Smith et al. |
| 5,794,435 | A | 8/1998 | Jones et al. |
| 5,799,902 | A * | 9/1998 | Keith .............. B64G 1/002 244/172.3 |
| 5,819,526 | A | 10/1998 | Jackson et al. |
| 6,073,437 | A | 6/2000 | Jones et al. |
| 6,101,808 | A | 8/2000 | Knuth et al. |
| 6,135,393 | A * | 10/2000 | Sackheim .............. B64G 1/26 244/169 |
| 6,272,846 | B1 | 8/2001 | Schneider |
| 6,298,659 | B1 | 10/2001 | Knuth et al. |
| 6,311,477 | B1 * | 11/2001 | Schneider .............. C06B 47/06 244/169 |
| 6,354,074 | B1 | 3/2002 | Jones et al. |
| 6,590,403 | B1 | 7/2003 | Gramer et al. |
| 6,601,380 | B2 | 8/2003 | Knuth et al. |
| 6,865,878 | B2 | 3/2005 | Knuth et al. |
| 7,770,380 | B2 | 8/2010 | Dulligan et al. |
| 9,038,368 | B2 | 5/2015 | Fuller |
| 9,458,796 | B2 | 10/2016 | Chen et al. |
| 2001/0022954 | A1 | 9/2001 | Sakashita et al. |
| 2002/0036038 | A1 | 3/2002 | Karabeyoglu |
| 2002/0069636 | A1 | 6/2002 | Knuth et al. |
| 2004/0068976 | A1 | 4/2004 | Knuth et al. |
| 2004/0197247 | A1 | 10/2004 | Lohner et al. |
| 2007/0074501 | A1 | 4/2007 | Oren |
| 2007/0144140 | A1 | 6/2007 | Sarigul-Klijn et al. |
| 2008/0056961 | A1 | 3/2008 | Matveev |
| 2009/0031700 | A1 * | 2/2009 | Karabeyoglu .............. C10L 1/12 60/205 |
| 2009/0217525 | A1 | 9/2009 | Fuller et al. |
| 2009/0217642 | A1 | 9/2009 | Fuller et al. |
| 2012/0060464 | A1 | 3/2012 | Grote et al. |
| 2013/0031888 | A1 | 2/2013 | Fuller |
| 2013/0042596 | A1 | 2/2013 | Fuller |
| 2014/0026537 | A1 | 1/2014 | Eilers et al. |
| 2014/0123654 | A1 | 5/2014 | Kemmerer et al. |
| 2014/0260305 | A1 | 9/2014 | Hobbs et al. |
| 2014/0352276 | A1 | 12/2014 | Chen et al. |
| 2018/0118634 | A1 | 5/2018 | Sherman et al. |
| 2018/0156159 | A1 | 6/2018 | Adriany |
| 2018/0334996 | A1 | 11/2018 | Chew et al. |
| 2020/0116106 | A1 | 4/2020 | Chiaverini et al. |
| 2020/0240365 | A1 | 7/2020 | Elzein et al. |

OTHER PUBLICATIONS

Fletcher-Wood, Hydrazine, 2016, RSC Education (Year: 2016).*
Brinkley, A. et al. (2015). *Development and test of a 90% H2O2/ Kerosene decent thruster for the rocket City Space Pioneer's Google X Prize Lunar Lander*. Dynetics Inc., 25 pages.
Chemical and Material Sciences Department, Research Division. *Hydrogen Peroxide Handbook*, Technical Report AFRPL-TR-67-144. Rocketdyne, a Division of North American Aviation, Inc., 1967. 488 pages.
Jonker, W.A., et al. (2011). *Development of a Rocket Engine Igniter Using the Catalytic Decomposition of Hydrogen Peroxide*. TNO Science and Industry, 6 pages.
Krishnan, S., Ahn, S., & Lee, C. (2010). Design and Development of a Hydrogen-Peroxide Rocket Engine Facility. 10 pages. oai:generic. eprints.org:7057/core392.
Lee, S-L. et al. (Jan. 2009, e-published Apr. 24, 2008). "Performance characteristics of silver catalyst bed for hydrogen peroxide." *Aerospace Science and Technology*,13, 12-17.
Love, J. E., & Stillwell, W. H. (1959). *The hydrogen-peroxide rocket reaction-control system for the X-1B research airplane. Tech Note D-185*. Washington, DC: National Aeronautics and Space Administration. 30 pages.
Maia, F.F. et al. (2014). "Development and Optimization of a Catalytic Thruster for Hydrogen Peroxide Decomposition." *Journal of Aerospace Technology and Management*, 6, 61-67.
McCormick, J.C. (1965). *Hydrogen Peroxide Rocket Manual*. FMC Corporation. Propulsion Department, 220 pages.
Othman, N. et al. (2011). "Design and Testing of a 50N Hydrogen Peroxide Monopropellant Rocket Thruster." *Jurnal Mekanikal*. 33(2):70-81.
Palmer, M., Musker, A., & Roberts, G. (2011). Experimental Assessment of Heterogeneous Catalysts for the Decomposition of Hydrogen Peroxide. *47th AIAA/ASME/SAE/ASEE Joint Propulsion Conference & Exhibit*. 9 pages, doi:10.2514/6.2011-5695.
Ventura, M., Wernimont, E., Heister, S., & Yuan, S. (2007). Rocket Grade Hydrogen Peroxide (RGHP) for use in Propulsion and Power Devices—Historical Discussion of Hazards. *43rd AIAA/ASME/SAE/ ASEE Joint Propulsion Conference & Exhibit*. 22 pages. doi:10. 2514/6.2007-5468.
Wernimont, E., & Durant, D. (2004). State of the Art High Performance Hydrogen Peroxide Catalyst Beds. *40th AIAA/ASME/SAE/ ASEE Joint Propulsion Conference and Exhibit*. 7 pages, doi:10. 2514/6.2004-4147.
Wernimont, E.J. et al. (1999). "Past and Present Uses of Rocket Grade Hydrogen Peroxide." *2nd International Hydrogen Peroxide Propulsion Conference*, 15 pages.
Wieling, W., Zandbergen, B.T.C., Mayer, A, & Schrijer, F. (2012). Development of a Hydrogen Peroxide/Ethanol Thruster for the Advanced Re-entry Vehicle. *Space Propulsion 2012*. 11 pages.
Willis, C.M. (1960). *The Effect of Catalyst-Bed Arrangement on Thrust Buildup and Decay Time for a 90 Percent Hydrogen Peroxide Control Rocket*. Tech Note D-516, National Aeronautics and Space Administration, 39 pages.
Bath, Andrew, Performance Characterization of Complex Fuel Port Geometries for Hybrid Rocket Fuel Grains, Dec. 2012, Utah State University, pp. 13-14 (Year: 2012).
Palmer, M. J. (2014). Experimental evaluation of hydrogen peroxide catalysts for monopropellant attitude control thrusters. University of Southampton, Faculty of Engineering and the Environment, Aero- (56) References Cited

OTHER PUBLICATIONS dynamics and Flight Mechanics Group, PhD Thesis. 271 pages. https://eprints.soton.ac.uk/385352/.

Zandbergen, Some Typical Solid Propellant Rocket Motors, Dec. 2013, Delft University of Technology, pp. 4-6 (Year: 2013).

Ryan, H.M. et al. (Jan.-Feb. 1995). "Atomization characteristics of impinging liquid jets." Journal of Propulsion and Power, 11:1, 135-145.

"Mesh and Micron Sizes" ISM Industrial Specialties Mfg. & IS MED Specialties, Mar. 11, 2020, pp. 1-7 (Year: 2020).

Messineo et al. (2018). "Introduction to Resistor-Based Sensors for Feedback Control of Hybrid Rocket Engines", Publication Jun. 2018, pp. 1-4 (Year: 2018).

Messineo et al. (2019). "Theoretical Investigation on Feedback Control of Hybrid Rocket Engines, Institute of Space and Astronautical Science", Japan Aerospace Exploration Agency, Published Jun. 3, 2019, pp. 1-51, (Year: 2019).

Thomas et al. (2015). "Enhancement of Regression Rates in Hybrid Rockets with HTPB Fuel Grains by Metallic Additives", AIAA Propulsion and Energy Forum, Jul. 27-29, 2015, pp. 1-16 (Year: 2015).

Haq, N. Ul, et al. (2017). "Design, Development and Testing of 1N Hydrogen Peroxide Thruster." 2017 14th International Bhurban Conference on Applied Sciences and Technology (IBCAST). IEEE, 2017. pp. 599-607.

Neumaier, W.W. et al. (2012). "Development of a 90% Hydrogen Peroxide Mono-Propellant Propulsion System for the Warm Gas Test Article." 48th AIAA/ASME/SAE/ASEE Joint Propulsion Conference & Exhibit. 2012. pp. 1-11.

* cited by examiner

REACTION CONTROL VORTEX THRUSTER SYSTEM

TECHNICAL FIELD

The subject matter described herein relates to a vortex thruster system that can generate various thrust levels.

BACKGROUND

Design requirements for a rocket combustion engine can include competing or conflicting requirements. For example, an efficient rocket combustion chamber can thoroughly mix fuel and oxidizer to generate complete combustion. However, complete combustion can cause intense thermal stress of the rocket engine hardware. A cooling mechanism may be required to prevent overheating, but conventional cooling mechanisms can add weight to a system that is mass-sensitive.

Some rocket engines can achieve high mixing rates and combustion efficiencies through the use of complex propellant injectors that can be heavy and expensive to manufacture. Furthermore, some rocket engines include intricate regenerative coolant channels to remove heat from the rocket hardware. Such rocket engine configurations may be difficult and expensive to manufacture, as well as require an increase in overall size and weight of the rocket engine.

SUMMARY

Aspects of the current subject matter include various embodiments of a vortex thruster system that can generate various thrust levels. In one aspect, the vortex thruster system can include a catalyst bed configured to decompose a monopropellant delivered to the catalyst bed. Additionally, the vortex thruster system can include a first valve for controlling delivery of the monopropellant at a first flow rate into the catalyst bed to transform the monopropellant into a decomposed monopropellant. Furthermore, the vortex thruster system can include a vortex combustion chamber in fluid communication with the catalyst bed. The vortex combustion chamber can be configured to receive the decomposed monopropellant from the catalyst bed and the decomposed monopropellant can assist with creating a first thrust level.

In some variations one or more of the following features can optionally be included in any feasible combination. In some embodiments, the vortex thruster system can include a second valve for controlling a second flow rate of the monopropellant into the catalyst bed. The second flow rate can be greater than the first flow rate. The delivery of the monopropellant at the second flow rate can generate a second thrust level that is greater than the first thrust level.

In some embodiments, the vortex thruster system can include a secondary propellant valve configured to deliver a secondary propellant into the vortex combustion chamber including the decomposed monopropellant to create a third thrust level that is greater than the second thrust level.

In some embodiments, the monopropellant can include hydrogen peroxide or hydrazine. The decomposed monopropellant can include water vapor and oxygen. The decomposed monopropellant can include nitrogen, hydrogen, and ammonia. The secondary propellant can include a kerosene or a mixed oxide of nitrogen.

In some embodiments, the vortex combustion chamber can include at least one side injection port positioned proximate to a sidewall of the vortex combustion chamber and configured to deliver a first amount of the decomposed monopropellant into the vortex combustion chamber in a direction that is approximately tangent to the sidewall. In some embodiments, the vortex combustion chamber can include a proximal injection port positioned proximate to a proximal end of the vortex combustion chamber and configured to deliver a second amount of the decomposed monopropellant into a center area of the vortex combustion chamber.

In another interrelated aspect of the current subject matter, a method includes activating a first monopropellant valve to deliver a monopropellant at a first flow rate to a catalyst bed of the vortex thruster system to form a decomposed monopropellant. The method can further include decomposing the monopropellant in the catalyst bed. Additionally, the method can include delivering the decomposed monopropellant into a vortex combustion chamber of the vortex thruster system to assist with generating a first thrust level.

In some embodiments, the delivering of the decomposed monopropellant into the vortex combustion chamber can include delivering a first amount of the decomposed monopropellant through a first injection port positioned proximate a sidewall of the vortex combustion chamber and configured to deliver the first amount of the decomposed monopropellant in a direction tangent to the sidewall. In some embodiments, the delivering of the decomposed monopropellant into the vortex combustion chamber can include delivering a second amount of the decomposed monopropellant through a second injection port positioned proximate to a proximal end of the vortex combustion chamber and configured to deliver the second amount of the decomposed monopropellant into a center area of the vortex combustion chamber.

In some embodiments, the method can further include activating a second monopropellant valve to deliver the monopropellant at a second flow rate to the catalyst bed. The second flow rate can be greater than the first flow rate. The delivery of the monopropellant at the second flow rate can create a second thrust level that is greater than the first thrust level.

In some embodiments, the method can further include activating a secondary propellant valve to deliver a secondary propellant into the vortex combustion chamber including the decomposed monopropellant to create a third thrust level that is greater than the second thrust level. The monopropellant can include hydrogen peroxide or hydrazine. The secondary propellant can include kerosene or a mixed oxide of nitrogen.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Various embodiments of a vortex thruster system are described herein that can be included in various propulsion systems and can provide an efficient and effective way to generate various thrust levels. For example, the vortex thruster system can be configured to efficiently generate at least three discrete thrust levels, such as a high thrust level, a medium thrust level, and a low thrust level. Additionally, the vortex thruster system can be configured to generate a swirling or vortex flow field in a combustion chamber to limit thermal loading of the hardware of the vortex thruster system. Various vortex thruster system embodiments are described in greater detail below.

In some embodiments, the vortex thruster system can include a catalyst bed and at least one oxidizer or monopropellant injector configured to deliver a monopropellant into the catalyst bed. The catalyst bed can be configured to decompose the monopropellant, such as decompose hydrogen peroxide into high-temperature water vapor and gaseous oxygen. The catalyst bed can be in communication with a vortex combustion chamber such that the decomposed monopropellant formed in the catalyst bed can be delivered into the vortex combustion chamber. Delivery of the decomposed monopropellant into the vortex combustion chamber can generate thrust by exhausting the products of decomposition through a nozzle extending from the vortex combustion chamber.

In some embodiments, the vortex thruster system can control a flow rate at which the monopropellant is delivered to the catalyst bed, which can affect the amount of thrust generated at the nozzle. For example, the vortex thruster system can include a first monopropellant valve and a second monopropellant valve that are each configured to deliver the monopropellant at a different flow rate (e.g., a greater flow rate of the monopropellant into the catalyst bed can result in a greater generated thrust). In some embodiments, the vortex thruster system can include a secondary propellant valve that directly injects a secondary propellant (e.g., a kerosene) into the vortex combustion chamber to ignite with the decomposed monopropellant in a bi-propellant configuration to generate a highest thrust level that can be achieved by the vortex thruster system.

Furthermore, in some embodiments the vortex combustion chamber can include at least one tangential injection port, such as at least an array of tangential injection ports, that are configured to deliver the decomposed monopropellant in a direction tangential to a circumference of an inner cylindrical surface of the vortex combustion chamber. This tangential injection can cause a flow of the decomposed monopropellant to swirl in the vortex combustion chamber. The swirl flow may translate upwards towards the proximal end of the vortex combustion chamber where the flow can turn inward and move spirally away from a closed proximal end of the vortex combustion chamber, down the center of the vortex combustion chamber, and out the nozzle.

In some embodiments, the vortex thruster system may include at least one axial proximal injection port for delivering a portion of the decomposed monopropellant into a center area of the vortex combustion chamber. This may assist with efficiently and effectively optimizing the vortex combustion chamber for achieving a desired thrust level while simultaneously limiting the thermal load on the thruster hardware. As described herein, a thrust level can include an approximate range of thrust loads, such as a low thrust level including a first thrust load range (e.g., approximately 20 lbf to 30 lbf), a medium thrust level including a second thrust load range (e.g., approximately 50 lbf to 60 lbf), and a high thrust level including a third thrust load range (e.g., approximately 100 lbf to 120 lbf). Other thrust levels and thrust load ranges are within the scope of this disclosure.

Figure 1:
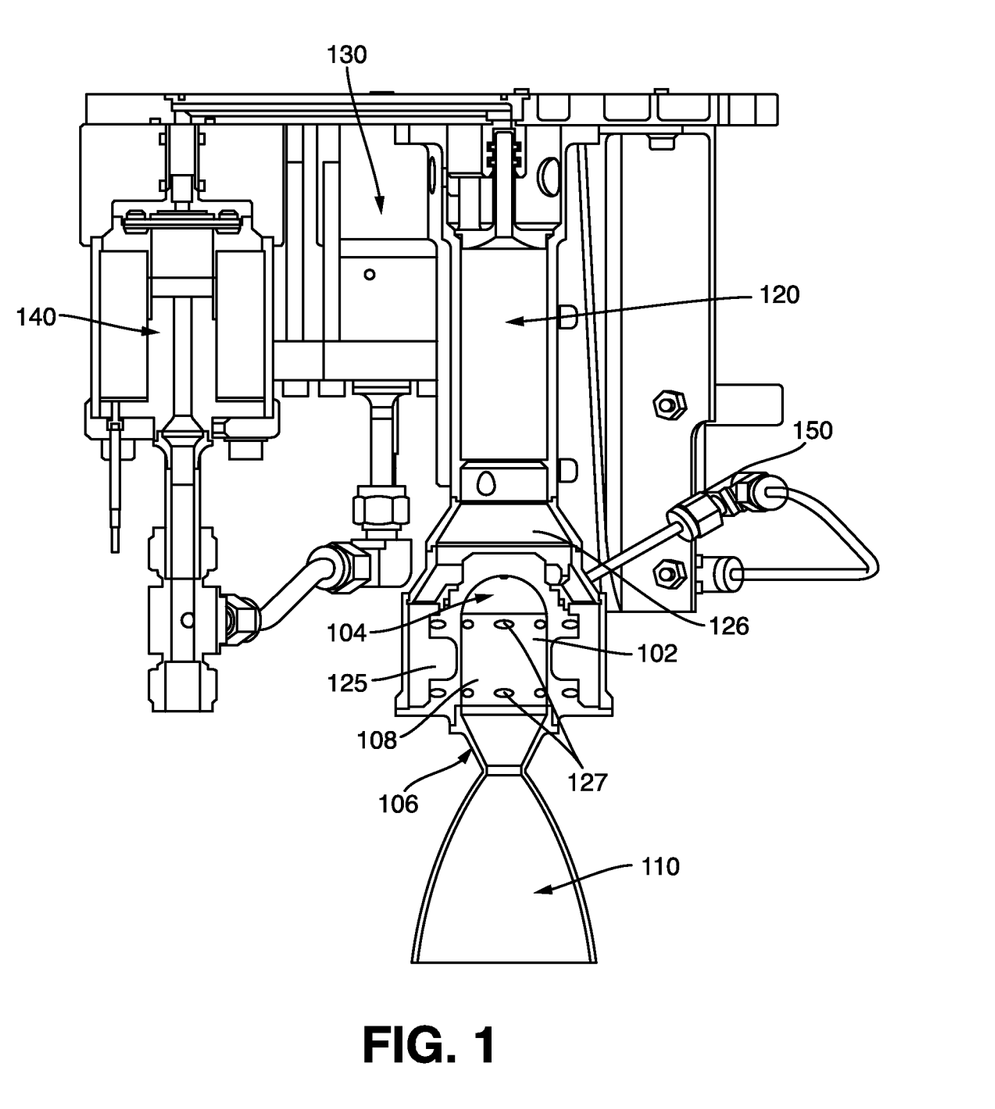
FIG. 1 illustrates a first section view of an embodiment of a vortex thruster system consistent with implementations of the current subject matter.
Figure 2:
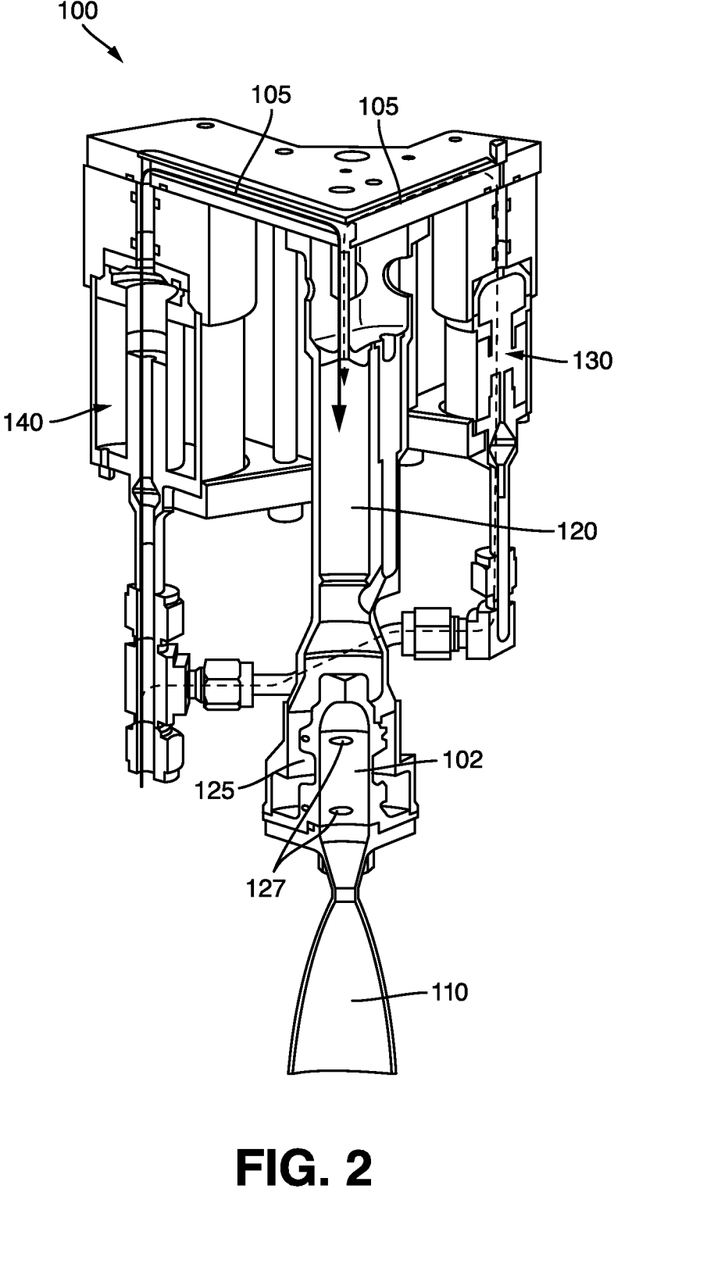
FIG. 2 illustrates a second section view of the vortex thruster system of FIG. 1 showing a first propellant valve and a second propellant valve in fluid communication with a catalyst bed.
Figure 3:
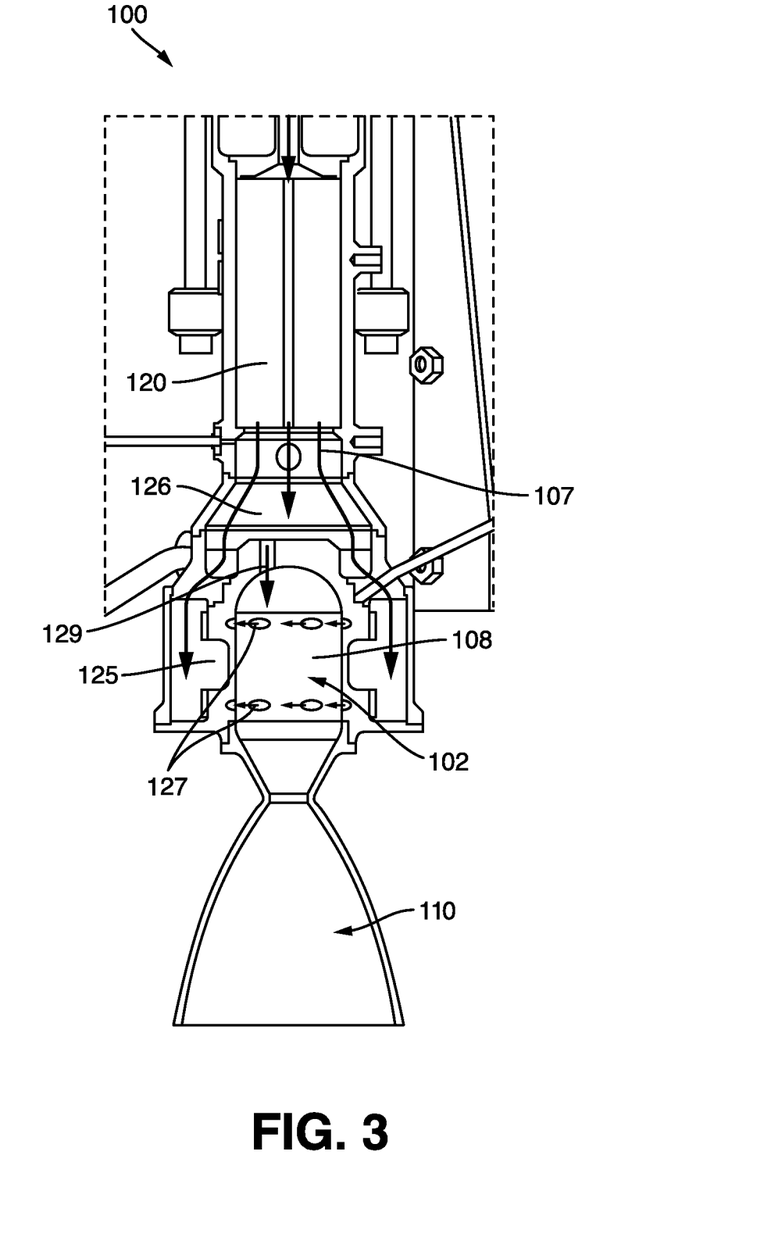
FIG. 3 illustrates a partial section view of the vortex thruster system of FIG. 1 showing a fluid pathway between a secondary propellant injector and a vortex combustion chamber, as well as fluid pathways between the catalyst bed and the vortex combustion chamber.

FIGS. 1-3 illustrate an embodiment of a vortex thruster system 100 configured to efficiently and effectively generate at least three discrete thrust levels. As shown in FIG. 1, the vortex thruster system 100 can include a vortex combustion chamber 102 having a proximal end 104, a distal end 106, and a sidewall 108 extending between the proximal end 104 and distal end 106. The vortex combustion chamber 102 may be cylindrical in shape, as shown in FIG. 1, however, other shapes are within the scope of this disclosure. For example, the proximal end 104 of the vortex combustion chamber may include a hollow dome-shape and the distal end 106 may include a converging-diverging nozzle 110 that provides a passageway through the distal end 106 of the vortex combustion chamber 102, as shown in FIG. 1.

As shown in FIG. 1, the vortex thruster system 100 may include a catalyst bed 120 and at least one monopropellant valve, such as a first monopropellant valve 130 and a second monopropellant valve 140, in communication with the catalyst bed 120. In some embodiments, the first monopropellant valve 130 is configured to provide a different flow rate of monopropellant 105 into the catalyst bed 120 compared to the second monopropellant valve 140. For example, the first monopropellant valve 130 can provide a lower flow rate of monopropellant to allow the vortex thruster system 100 to generate a first, lower thrust level. Additionally, the second monopropellant valve 130 can provide a higher flow rate of monopropellant to allow the vortex thruster system 100 to generate a higher, second thrust level that is greater than the first, lower thrust load.

The catalyst bed 120 can be configured to decompose the monopropellant 105 as it flows axially through the catalyst bed 120. The decomposed monopropellant 107 can then be delivered into the vortex combustion chamber 102 to assist with generating thrust, as will be described in greater detail below. In some embodiments, the monopropellant 105 can include a liquid hydrogen peroxide (e.g., 90% hydrogen peroxide) and the decomposed monopropellant 107 can include water vapor and gaseous oxygen. Other monopropellants (e.g. hydrazine) are within the scope of this disclosure. In some embodiments, the catalyst bed 120 can include a stack of reactive and inert metallic screens. Other catalyst beds that can decompose monopropellants (e.g. iridium-coated alumina pellet beds) are within the scope of this disclosure.

As shown in FIGS. 1 and 3, some embodiments of the vortex thruster system 100 can include an annular chamber 125 positioned around at least a part of the vortex combustion chamber 102 and in fluid communication with an outlet of the catalyst bed 120. The annular chamber 125 can allow the decomposed monopropellant 107 to enter the vortex combustion chamber by passing through at least one array of tangential injection ports 127 positioned along the sidewall 108 of the vortex combustion chamber 102, as shown in FIG. 3. The vortex thruster system 100 can include a proximal chamber 126 for allowing the decomposed monopropellant 107 to be injected into a proximal end of the vortex combustion chamber 102 through at least one proximal injection port 129, as also shown in FIG. 3. Any number of chambers and injectors can be included in the vortex thruster system 100 for directing and controlling the delivery of the decomposed monopropellant 107 into the vortex combustion chamber 102.

As shown in FIGS. 1 and 3, at least one array of tangential injection ports 127 may be positioned along the sidewall 108 of the vortex combustion chamber and configured to direct the decomposed monopropellant 107 at a direction that is tangential to the circumference of the inner cylindrical surface of the sidewall 108 of the vortex combustion chamber 102. This creates a swirling or vortex flow field of the decomposed monopropellant 116 along an outer circumference of the vortex combustion chamber 102. Such swirling can improve combustion efficiency and control hardware temperatures by shielding the vortex combustion chamber walls from high-temperature products of combustion.

As shown in FIGS. 1 and 3, at least one proximal injection port 129 may be axially positioned along the proximal end 104 of the vortex combustion chamber 102. For example, the proximal injection port 129 may be positioned approximately parallel to or along a longitudinal axis of the vortex combustion chamber 102. The proximal injection port 129 may be configured to deliver a portion of the decomposed monopropellant 107 into a combustion zone at or near the centerline of the vortex combustion chamber 102 (e.g., along a longitudinal axis of the vortex combustion chamber). The proximal injection port 129 may provide a trim function that can balance mixing and cooling functions of the vortex flow field.

As shown in FIG. 1, some embodiments of the vortex thruster system 100 can include a secondary propellant valve 150 configured to directly inject a secondary propellant (e.g., kerosene, such as RP-1 kerosene) directly into the vortex combustion chamber 102. Other secondary propellants (e.g., mixed oxides of nitrogen (MON)) are within the scope of this disclosure. As shown in FIG. 1, the secondary propellant can be delivered to a proximal end of the vortex combustion chamber. The secondary propellant can mix with high-temperature products of the decomposed monopropellant in the vortex combustion chamber to generate a desired thrust level (e.g., a high thrust mode).

As discussed above, the vortex thruster system 100 can be configured to generate at least three different thrust levels that each generate discrete thrust loads or load ranges. For example, the vortex thruster system 100 can generate a low thrust level (e.g., generates approximately 24 lbf), a medium thrust level (e.g., generates approximately 55 lbf), and a high thrust level (e.g., generates approximately 110 lbf). For example, the low thrust level can be achieved by activating the first monopropellant valve 130 thereby delivering the monopropellant at a first, lower flow rate into the catalyst bed 120. Additionally, the medium thrust level can be achieved by activating the second monopropellant valve 140 thereby delivering the monopropellant at a second, greater flow rate into the catalyst bed 120. Furthermore, the high thrust level can be achieved by activating the second monopropellant valve 140 as well as the secondary propellant valve 150 to allow the secondary propellant to mix and ignite with the decomposed monopropellant 107 in the vortex combustion chamber 102.

For example, during operation of the vortex thruster system 100 to achieve a low, medium, or high thrust level, liquid hydrogen peroxide can be injected into the catalyst bed 120 where the liquid hydrogen peroxide exothermically decomposes into gaseous oxygen and water vapor as it flows axially through the catalyst bed 120. Additionally, upon exiting the catalyst bed 120, the decomposed monopropellant 107 can be approximately 1,400 degrees F. and can flow into the annular chamber 125 and/or proximal chamber 126 surrounding the vortex combustion chamber 102. The hot oxidizing gas (e.g., the decomposed monopropellant 107) can then enter the vortex combustion chamber 102 through the array of tangential injection ports 127 and/or the proximal injection port 129. The result of the decomposed monopropellant in the vortex combustion chamber can result in the flow of hot gas through the nozzle 110 (e.g., niobium nozzle) and the generation of monopropellant thrust (e.g., low or medium thrust levels).

Furthermore, to generate the high thrust level, a secondary propellant (e.g., kerosene) can be added to vortex combustion chamber 102 to allow mixing and burning of the secondary monopropellant and decomposed monopropellant in the vortex combustion chamber 102. The products of such mixing and burning can result in combustion flow through the nozzle 110 (e.g., niobium nozzle) and generation of bipropellant thrust. In some embodiments, the nozzle 110 may be coated with a silicide coating that can protect against oxidation of the niobium. Other features, functions and benefits of the vortex thruster system 100 are within the scope of this disclosure.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A vortex thruster system, comprising:
a catalyst bed contained in a catalyst bed housing, the catalyst bed housing having an inlet for receiving a monopropellant to be transformed into a decomposed monopropellant by the catalyst bed, the catalyst bed housing having an outlet configured to allow the decomposed monopropellant to be dispensed from the catalyst bed housing for generating a first thrust level or a second thrust level;
a first valve for controlling delivery of the monopropellant at a first flow rate into the catalyst bed housing to transform the monopropellant into the decomposed monopropellant;
a second valve for controlling a second flow rate of the monopropellant at a second flow rate into the catalyst bed housing to transform the monopropellant into the decomposed monopropellant, the second flow rate being greater than the first flow rate;
a vortex combustion chamber configured to receive the decomposed monopropellant for assisting with creating the first thrust level as a result of the first flow rate of monopropellant delivered into the catalyst bed housing and creating the second thrust level as a result of the second flow rate of monopropellant delivered into the catalyst bed housing, the second thrust level being greater than the first thrust level;
an annular chamber extending along a side wall of the vortex combustion chamber, the annular chamber in fluid communication with and downstream from the outlet of the catalyst bed housing for receiving a first portion of the decomposed monopropellant, the side wall including a plurality of tangential ports extending between the annular chamber and the vortex combustion chamber, the plurality of tangential ports positioned for delivering the first portion of the decomposed monopropellant into the vortex combustion chamber in a direction that is tangent to an inner cylindrical surface of the vortex combustion chamber; and
a proximal chamber positioned upstream from the annular chamber and along a proximal wall of the vortex combustion chamber, the proximal chamber positioned downstream from the outlet of the catalyst bed housing for receiving a second portion of the decomposed monopropellant dispensed from the outlet of the catalyst bed housing, the proximal wall including a proximal injection port oriented approximately parallel to a longitudinal axis of the vortex combustion chamber for delivering the second portion of the decomposed monopropellant into a combustion zone extending along the longitudinal axis of the vortex combustion chamber, wherein the vortex combustion chamber is configured to receive the first portion and the second portion of the decomposed monopropellant to create the first thrust level or the second thrust level.

2. The vortex thruster system of claim 1, wherein the monopropellant is hydrogen peroxide.

3. The vortex thruster system of claim 1, wherein the monopropellant is hydrazine.

4. The vortex thruster system of claim 1, wherein the decomposed monopropellant comprises water vapor and oxygen.

5. The vortex thruster system of claim 1, wherein the decomposed monopropellant comprises nitrogen, hydrogen, and ammonia.

6. The vortex thruster system of claim 1, further comprising a secondary propellant valve configured to deliver a secondary propellant into the vortex combustion chamber including the decomposed monopropellant to create a third thrust level that is greater than the second thrust level.

7. The vortex thruster system of claim 6, wherein the secondary propellant is kerosene.

8. The vortex thruster system of claim 6, wherein the secondary propellant is a mixed oxide of nitrogen.

9. A method of a vortex thruster system, comprising:
activating a first monopropellant valve to deliver a monopropellant at a first flow rate to a catalyst bed housing of the vortex thruster system to form a decomposed monopropellant, the catalyst bed housing containing a catalyst bed and having an outlet configured to allow the decomposed monopropellant to be dispensed from the catalyst bed housing for generating a first thrust level or a second thrust level;
decomposing the monopropellant in the catalyst bed housing;
delivering a first portion of the decomposed monopropellant into a vortex combustion chamber of the vortex thruster system, the first portion of the decomposed monopropellant being delivered from an annular chamber downstream from the outlet of the catalyst bed housing, the annular chamber extending along a sidewall of the vortex combustion chamber, the first portion delivered in a direction that is tangent to an inner cylindrical surface of the vortex combustion chamber;
delivering a second portion of the decomposed monopropellant into the vortex combustion chamber, the second portion of the decomposed monopropellant being delivered from a proximal chamber positioned upstream from the annular chamber and along a proximal wall of the vortex combustion chamber, the proximal chamber positioned downstream from the outlet of the catalyst bed housing for receiving the second portion of the decomposed monopropellant dispensed from the catalyst bed housing, the second portion delivered into a combustion zone extending along the longitudinal axis of the vortex combustion chamber;
generating, as a result of the delivered first portion and second portion of the decomposed monopropellant, a first thrust level;
activating a second monopropellant valve to deliver the monopropellant at a second flow rate to the catalyst bed housing to form the decomposed monopropellant, the second flow rate being greater than the first flow rate; and
generating, as a result of the delivered monopropellant at the second flow rate to the catalyst bed housing, a second thrust level that is greater than the first thrust level.

10. The method of claim 9, wherein the delivering of the first portion of the decomposed monopropellant into the vortex combustion chamber comprises delivering the first portion of the decomposed monopropellant through a first injection port positioned proximate and tangential to the sidewall of the vortex combustion chamber.

11. The method of claim 10, wherein the delivering of the second portion of the decomposed monopropellant into the vortex combustion chamber comprises delivering the second portion of the decomposed monopropellant through a second injection port oriented approximately parallel to a longitudinal axis of the vortex combustion chamber.

12. The method of claim 9, wherein the monopropellant is hydrogen peroxide or hydrazine.

13. The method of claim 9, further comprising:
   activating a secondary propellant valve to deliver a secondary propellant into the vortex combustion chamber including the decomposed monopropellant to create a third thrust level that is greater than the second thrust level.

14. The method of claim 13, wherein the secondary propellant is kerosene or a mixed oxide of nitrogen.

* * * * *